(No Model.) 4 Sheets—Sheet 4.

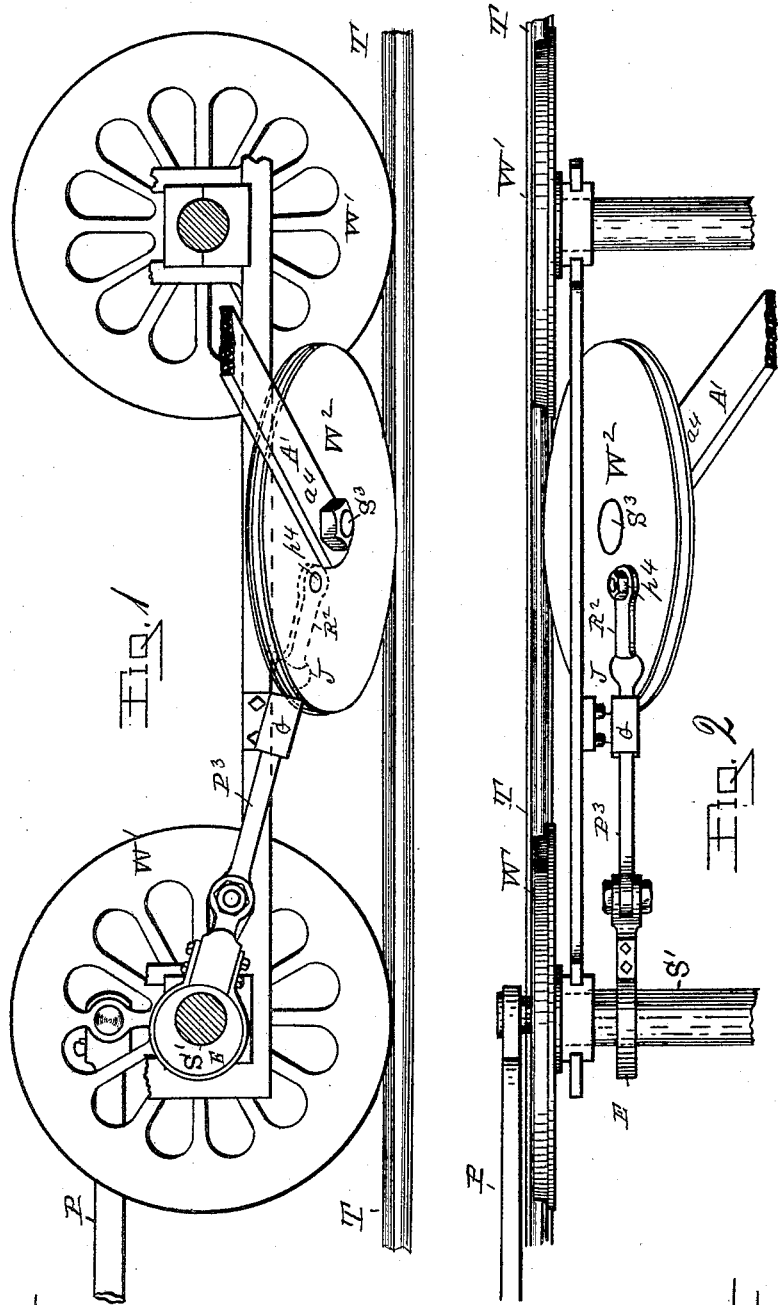

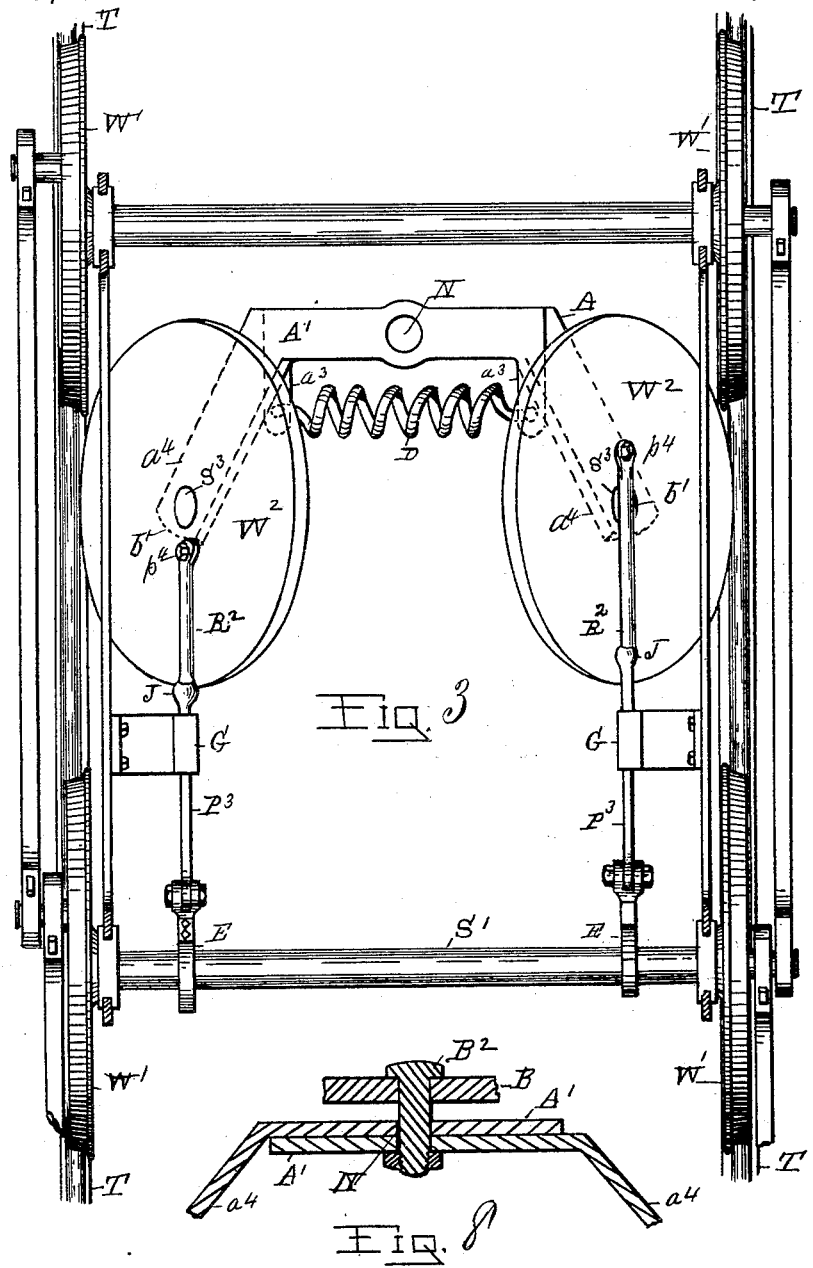

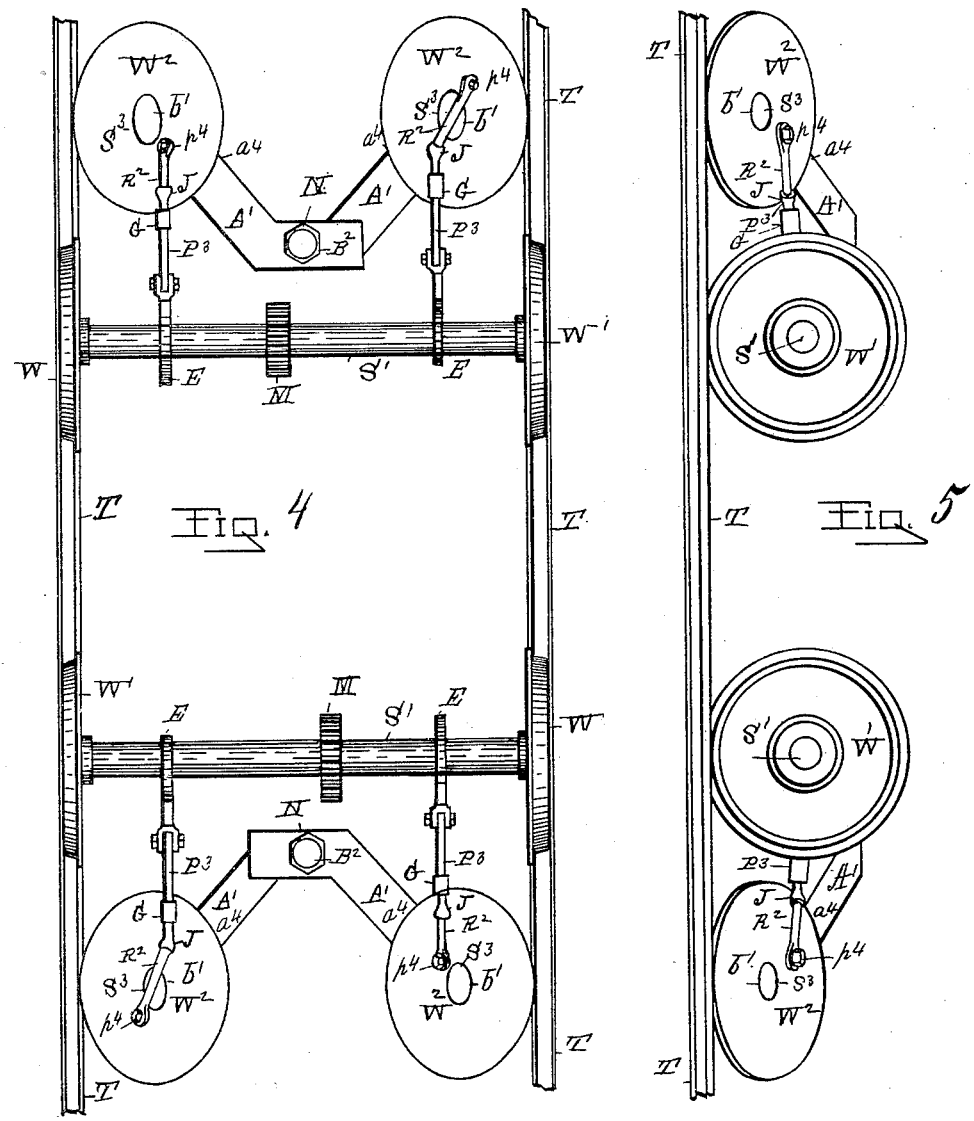

H. L. VAN ZILE.
TRACTION MECHANISM FOR SELF PROPELLING VEHICLES.

No. 399,298. Patented Mar. 12, 1889.

WITNESSES
Geo. A. Darby

INVENTOR
Harry L. Van Zile

UNITED STATES PATENT OFFICE.

HARRY L. VAN ZILE, OF ALBANY, ASSIGNOR OF TWO-THIRDS TO OSCAR E. VAN ZILE, OF TROY, AND JOHN MacCORMACK, OF ALBANY, NEW YORK.

TRACTION MECHANISM FOR SELF-PROPELLING VEHICLES.

SPECIFICATION forming part of Letters Patent No. 399,298, dated March 12, 1889.

Application filed February 27, 1888. Serial No. 265,452. (No model.)

*To all whom it may concern:*

Be it known that I, HARRY L. VAN ZILE, of the city and county of Albany, and State of New York, have invented a new and useful Traction Mechanism, of which the following is a specification.

My invention relates to a new application of traction or driving wheels for moving cars, locomotives, or other vehicles along and over a rail-track; and it is the object and purpose of my invention to utilize frictional traction for propulsion by means of power applied to drivers, making an engagement with the sides of the rails.

My invention consists (as will be more fully detailed hereinafter in connection with its illustration) in the application of traction or driving wheels that are arranged upon the outer end of pivoted arms, which are extended rearwardly from where pivoted to the truck, said traction or driving wheels being constructed and arranged to have power applied thereto and to make a tangent engagement with the sides of the rails, such traction or driving wheels being used in connection with other wheels supporting the weight of the locomotive or car upon the rails.

Accompanying this specification to form a part of it there are four plates of drawings containing seven figures illustrating my invention, with the same designation of parts by letter-reference used in all of them.

Figure 6:
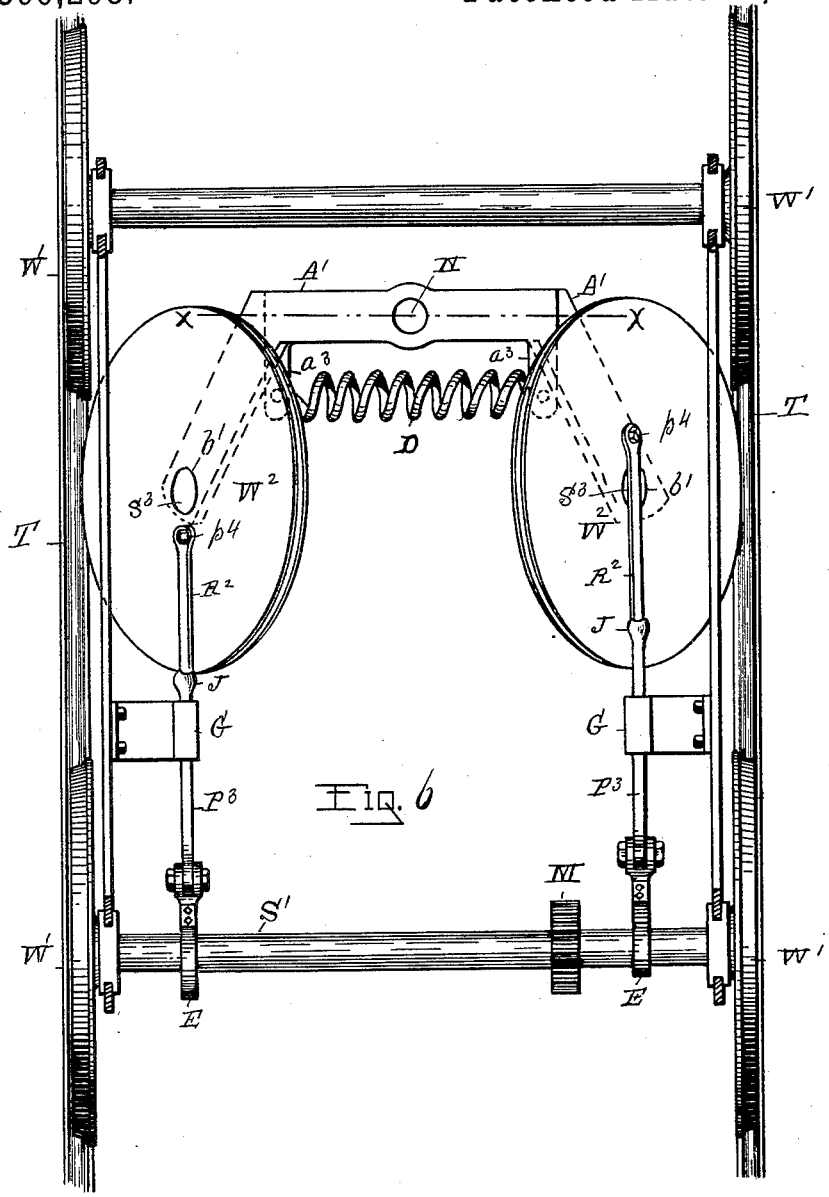
Figure 7:
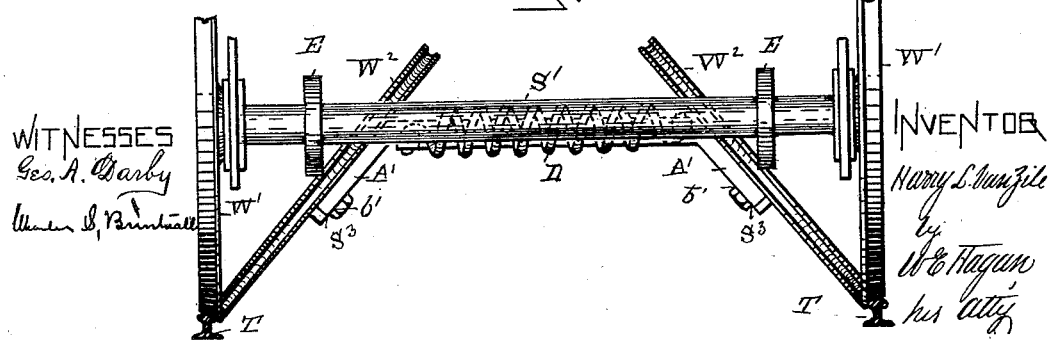

Of the illustrations, Figure 1 is a side elevation of a pair of connected locomotive-drivers that are arranged to operate in connection with my improved traction mechanism. Fig. 2 is a top view of the parts shown at Fig. 1. Fig. 3 is a top view of a street-car truck with my invention applied thereto. Fig. 4 is a top view of a street-car truck with my invention applied to each end thereof for moving it in opposite directions. Fig. 5 is a side elevation of the wheels and drivers shown at Fig. 4. Fig. 6 shows a top view of a street-car truck with my improved traction or driving wheels shown as applied thereto and as projected rearwardly from the forward axle. Fig. 7 is a rear end elevation of the mechanism shown at Fig. 6. Fig. 8 is a section taken on the line $x\ x$ of Fig. 6.

At Figs. 4 and 5 my improvement is shown as applied to each end of a street-car truck, to be used in moving the latter in either direction, that one of the two sets of drivers being the operating one which will be at the rear considered with relation to the direction in which the truck is moving. In the other, Figs. 3, 6, and 7, where but one set of my improved traction wheels or drivers is used, the rear of the truck is that end of it toward which the pivoted arms supporting the drivers are projected from the truck. The several parts of the mechanism thus illustrated are designated by letter-reference, and the function of the parts is described as follows:

The letters T T designate the rail-track, W' the usual driving-wheels, and $W^2$ driving-wheels operating by means of my new application of traction.

The letter S designates the shaft of the usual driving-wheels, which shaft is, where used in connection with a street-car truck, adapted to receive power from an electrical or other motor at M, as shown at Figs. 4 and 6, and at Figs. 1 and 2 by means of the pitman-rod P.

The letters A' designate two arms, each of which at its upper end is pivoted at N to the truck-frame B on the bolt $B^2$, and the lower ends, $a^4$, of each of these arms are projected downwardly and outwardly on an angle, and they are constructed with bearings $b'$ at their lower ends, in which the pintle-shafts $S^3$ of each of my improved traction-drivers turn. These arms A' at their upper ends are arranged to be one above the other where projected horizontally and pivoted to the bolt $B^2$, and they are each at their opposite ends constructed to have an angular projection, $a^3$, with an intermediately-placed spiral spring, D, connected therewith, which, as thus arranged, has the tendency to draw toward each other the projections $a^3$ on their pivot N, and thus tend to spread apart the arms at their lower ends, $a^4$, and so cause my angularly-placed drivers to make a tangent engagement with the inside face of each rail of the track. This spring is thus applied to make positive the tangent engagement of my angularly-placed driving-wheels and the track where from any cause the latter may have spread apart from its normal condition.

The letters $P^3$ designate pitman-rods, there being one for each of my angularly-placed drivers, and each of these pitman-rods is connected with and operated by an eccentric, E, upon the driving-shaft S'; and the letter G designates a guide-slide, in which each of the pitman-rods moves. The lower end of each of the pitman-rods $P^3$ makes a connection with the crank-pin rods $R^2$ by means of a ball-and-socket joint, (indicated at J,) and the lower end of each of the crank-pin rods upon each of the wheels makes a connection therewith by means of a crank-pin, $p^4$. The driving-wheels $W^2$, as thus placed on the lower ends of the arms A', are arranged upon an angle and so that the perimeter of each of them will make a tangent engagement with the inner face of each of the opposite sides of the track.

Where a traction-wheel is arranged on the outer end of an arm, which latter on its inner end is pivoted to the truck, and so that the rim of the traction or driving wheel will be tangent with the side of the rail, as herein shown, and power is applied to said traction-wheel or driver, it has the effect of forcing the rim of the latter where making a tangent engagement with the sides of the rail to bear against the latter with such force as to make a tractional engagement therewith that is sufficient in its frictional capacity for the moving of the vehicle, and without the intervention of the weight of the car or locomotive usually employed to produce the frictional traction for propulsion.

The operation of the parts thus illustrated is as follows: The weight of the car or locomotive being supported by the usual and ordinary wheels, W', upon the track, with power applied to the wheels $W^2$, the latter, under the action of the power applied, tend to spread apart on the pivoted connection made by the arms A, and this spreading apart causes them to engage with the inside of the rails with sufficient frictional traction to move the car or locomotive along over the track and up and along grades even where in the latter the ordinary frictional capacities of the traction produced by weight are insufficient to overcome the grade.

While I have shown my improved drivers as arranged to be operated in connection with power applied to the wheels supporting the car or locomotive, they may be operated in connection with the latter or with the ordinary wheels acting to support the weight of the car only.

While I have shown power as applied to the driving-wheels $W^2$ by means of a pitman-connection made therewith, any other well-known means for operating them may be used that will cause them to engage with the sides of the rails in such a manner as will produce the same tractional effect.

When acting upon a level my improved driving-wheels make a frictional traction with the sides of the rails from the power communicated to the drivers and the tendency of the applied power to spread the arms apart and the driving-wheels thereon to press upon the sides of the rail. When acting upon an ascending grade the power applied to the drivers acts in the same manner as when operating upon a level; but there is also added to this capacity the component force of gravity acting in the descending line of the grade, which also has the tendency to spread apart the arms on their pivoted connection and to force the drivers to contact with the sides of the rails.

Having thus described my invention, what I claim, and desire to secure by Letters Patent, is—

1. The combination, with a car or locomotive truck provided with wheels to support the weight of the car or locomotive upon a rail-track, of arms pivotally connected to said truck and extended rearwardly therefrom, and traction or driving wheels arranged on the outward end of said arms constructed to receive power and to make a tractional engagement with the sides of the rail-track, substantially in the manner as and for the purposes set forth.

2. The combination, with the truck of a car or locomotive that is provided with wheels to support the latter upon the rail-track and to receive power for the propulsion of the truck, of supplemental drivers or traction-wheels constructed to receive power and arranged to engage with the sides of the rail-track and mounted upon the rear end of arms that are pivotally connected to the truck, substantially in the manner as and for the purposes set forth.

3. In a traction mechanism for moving locomotives or street-cars upon a rail-track, the combination of traction-wheels arranged to support the weight of the locomotive or street-car and to have propelling-power applied thereto from their frictional engagement with the tops of the rails, arms pivotally connected to the car or locomotive truck and extended therefrom on an angle, and supplemental traction wheels or drivers arranged upon the rearwardly-extended ends of said arms so as to make a tangent engagement with the sides of the rails, substantially in the manner as and for the purposes set forth.

4. In a mechanism for moving cars or locomotives along and over a rail-track, the combination of traction-wheels arranged to support the weight of the car or locomotive upon the tops of the rails, arms pivoted to the car or locomotive truck-frame, which arms at their front ends where subtending their pivotal connection with the truck are connected by an intermediate spring and extended rearwardly from where pivoted upon an angle, and traction or driving wheels constructed to engage with the sides of the track and arranged on the rearward extension of said arms, substantially as and for the purposes set forth.

5. In a traction mechanism for moving locomotives or street-cars upon a rail-track, the combination of traction-wheels arranged to support the weight of the locomotive or street-car upon the tops of the rails and to have propelling-power applied thereto, arms that are pivotally connected on their ends with the car-truck and therefrom oppositely extended on an angle toward the track, and supplemental traction-wheels or drivers arranged on the rearward angular extension of said arms, said supplemental traction-wheels or drivers being constructed to receive power and to engage with the sides of the rail, substantially as shown and described.

Signed at Troy, New York, this 20th day of February, 1888, and in the presence of the two witnesses whose names are hereto written.

HARRY L. VAN ZILE.

Witnesses:
CHARLES S. BRINTNALL,
W. E. HAGAN.